United States Patent [19]
Brush II et al.

[11] Patent Number: 5,907,328
[45] Date of Patent: May 25, 1999

[54] AUTOMATIC AND CONFIGURABLE VIEWPOINT SWITCHING IN A 3D SCENE

[75] Inventors: Abbot Purdy Brush II, Woodbridge, Conn.; David Bruce Lection; Sandeep Kishan Singhal, both of Raleigh, N.C.

[73] Assignee: International Business Machines Corporation, Armonk, N.Y.

[21] Appl. No.: 08/920,346

[22] Filed: Aug. 27, 1997

[51] Int. Cl.$^6$ ..................................................... G06F 3/00
[52] U.S. Cl. ............................................ 345/358; 345/473
[58] Field of Search ................................... 345/358, 473, 345/940–949

[56] References Cited

U.S. PATENT DOCUMENTS

| | | | |
|---|---|---|---|
| 5,604,848 | 2/1997 | Haranda et al. | 345/419 |
| 5,675,746 | 10/1997 | Marshall | 705/35 |
| 5,694,533 | 12/1997 | Richards et al. | 345/425 |
| 5,696,892 | 12/1997 | Redmann et al. | 345/425 |
| 5,703,961 | 12/1997 | Rogina et al. | 382/154 |

FOREIGN PATENT DOCUMENTS 0 753 836 A2  1/1997  European Pat. Off. .

OTHER PUBLICATIONS

Guericke, K. "3–D multiuser applications enliven some online business environments," Netwrk World, V13, n46, p37(1), Nov. 1996.

Hideo, F., "Application of virtual reality in the development of the learning system for sign language," Nippon Bacharu Riariti . . . , v. 2nd, 1997, pp. 218–221.

Guericke, K., "Caligari Pioneer," Network World, v13, n46, p37(1), Nov. 1996.

Johnson, R. C., "Immersed in interactivity–. . . ," electronics Engineering Times, n876, 1995, p. 101.

*Primary Examiner*—A. Katbab
*Attorney, Agent, or Firm*—Jeanine S. Ray-Yarletts

[57] ABSTRACT

A method and apparatus for automatically changing a user's avatar's displayed view perspective in a virtual world upon execution of a gesture by the avatar, and in which the view perspective is changed for each gesture. The configuration of the view perspective switching specifies an action, a speed, a position and a return time. An avatar implementing the present invention allows the user to avoid manual view perspective switching which interferes with the immersive environment of a virtual world.

33 Claims, 6 Drawing Sheets

AUTOMATIC AND CONFIGURABLE VIEWPOINT SWITCHING IN A 3D SCENE

I. FIELD OF THE INVENTION

The present invention is related to, but not limited to, the traversal of the Internet, in particular the World-Wide Web. It specifically relates to the interaction of users of the World-Wide Web using proxies or representations of the user in a simulated or virtual world.

II. RELATED APPLICATIONS

None.

III. BACKGROUND OF THE INVENTION

In recent history, computers have become much more pervasive in society. In addition, they have become more powerful and faster, and have significantly more storage than they did just a few short years ago. These exponential increases in speed, storage and processor power have provided the necessary infrastructure for computers to network together effectively.

The most publicized computer network in existence is referred to as the Internet. The Internet is a connection of computers using the TCP/IP protocol. This has evolved into what is now referred to as the World-Wide Web which provides a somewhat cognitive interface into the Internet. The World-Wide Web allows users to access information by indicating the location of the information which they desire to retrieve or by traversing hyper-text links which cross-reference information in many different locations. This is made possible by the implementation of a universal resource locator (URL) as a way of locating information on the World-Wide Web.

Many products have been developed which assist the user in searching the web for information. Access to the World-Wide Web can be accomplished very inexpensively using a phone line, an inexpensive computer and a software program called a web browser such as Netscape's Navigator (™) or IBM's Web Explorer (™). This ability to inexpensively connect into the World-Wide Web has encouraged its use for much more than business purposes. The World-Wide Web is used for educational research, shopping, games, making reservations, trading stock and numerous other purposes. Children, as well as adults, are frequent users of the World-Wide Web.

While it was the advent of two-dimensional, graphically intense Web sites that spurred the popularity of the Internet, the next wave of technology will bring new interfaces to Internets, intranets and networks in general. These new interfaces will enable a more sensual interaction between the user and the content provided by the Web site. In particular, when a user interacts with the site, he can be immersed in a three-dimensional rendering of the site's information. This immersion might include audio cues or the ability to interact with other users. Collectively, these immersive interfaces are referred to as Virtual Reality, which provides a user-centric view of Web site content.

While Virtual Reality is still in its infancy, it traditionally uses computer simulations containing three-dimensional (3D) graphics and devices to allow the user to interact with the simulation. Much of what the user has been able to browse as "data" on the web may be able to be experienced as 3D Web sites in the future. Such Web sites are constructed with a Virtual Reality Modeling Language, herein referred to as VRML, which allows for the design and implementation of platform-independent scene descriptions. VRML is a file format for describing interactive 3D objects and worlds to be experienced on the World-Wide Web utilizing HTTP (A HyperText Transfer Protocol used on the Internet) in its implementation.

In today's virtual reality environments when a user enters a virtual world they take on a character persona known as the user's avatar. While the user is present in the world the user sees through the eyes of the avatar as they communicate with other avatars. The user can also signal the avatar to execute a range of emotions or actions that are viewable by any avatars looking in the user's direction. As the user signals the avatar to change emotion or execute a gesture a few problems arise:

1. the user cannot see the change in his own avatar's state; for example a smile or frown;
2. the user may not be able to see the reaction to his avatar's action or emotion among other avatars due to his close proximity to a single avatar; and
3. if the avatar's head moves sharply during a gesture (such as a nod) and this is faithfully reproduced to the user, the user may find the panning of the display disconcerting.

Current avatar implementations solve some of these problems by offering a manual selection for third-person perspective. This allows the user to traverse the virtual world while maintaining a third-person view or perspective of their avatar's facial and body positions. However, traveling in a virtual world with such a perspective destroys some of the benefits of participating in a virtual environment. Such a continual third-person perspective limits the user's ability to immerse themself in their virtual world. In this regard, today's avatar implementations require a user to manually select their avatar's perspective in advance and, thus, tradeoff first-person immersion in the world for viewing their avatar's gestures and actions instead.

I. SUMMARY OF THE INVENTION

The present invention satisfies the need for third-person gesture viewing while maintaining the general virtual reality objective of first-person immersion, by providing automatic viewpoint switching on a configurable, gesture-by-gesture basis. The tradeoff problem mentioned above is resolved by allowing the user to configure a smooth transition of the user's viewpoint from first-person to third-person (snap-view), and back to first-person when invoking a gesture or action.

Because no pre-set gesture viewpoints will satisfy the needs of varied users, the present invention defines an approach for configuring snap-view characteristics for each gesture an avatar can perform. For each gesture a user configures a snap-view action, snap-view speed, snap-view position and snap-review return time to be used when that gesture is executed in a virtual world. Snap-view action values indicate what action should be taken when a gesture is requested.

The present invention defines three possible values for the snap-view action: no action, view switch, or dual view. A value of "no action" indicates that a user's viewpoint should stay the same when executing the subject gesture. A value of "view switch" indicates that a user's viewpoint should completely switch to the snap-view before executing the subject gesture. A value of "dual view" indicates that a user's original viewpoint should remain while executing the subject gesture, but a viewpoint in another window should be created before the gesture is executed. This approach may be desirable when using an interface with multiple monitors or when viewing an interface having the capability for picture-in-picture views.

The present invention defines two characteristics which make up the snap-view position: location and direction. The location value defines the point in the virtual world relative to the avatar from which the snap-view originates. The direction value defines the point in the virtual world to which the snap-view should point. Although a reasonable default value for directional pointing would be to point directly back at the user's avatar, it may be desirable to point back in a manner that views the user's avatar in the left of the snap-view to allow viewing of other objects on the right-side of the snap-view. Both location and direction are configured in the present invention as three dimensional coordinates relative to the avatar's position.

Speed and return time are two further values defined by the present invention for user customization. Speed indicates how quickly the user would like a view switch to animate. Possible values to simplify configuring this field could be slow, medium and fast. The return time value defines how long a snap-view should be maintained after the subject gesture completes. This could allow a snap-view to remain a few seconds after the gesture completes to witness any response gestures by other avatars.

The present invention also defines a synchronization for gesture timing by requiring the avatar to wait until the snap-view has been established before proceeding to execute a gesture. This ensures that processing to switch viewpoints will not cause the resulting third-person view to capture only the end of a gesture or to miss the gesture entirely.

V. BRIEF DESCRIPTION OF THE FIGURES

FIG. 1 demonstrates an example network and virtual world spread over multiple physical servers in which the present invention is implemented.

VI. DETAILED DESCRIPTION OF THE PREFERRED EMBODIMENT

The preferred embodiment of the present invention is implemented using VRML in a virtual world. An avatar is implemented to represent a user, or one or more aspects of a user, in a virtual world. An example illustrating how snap-views can be used is one in which a user goes shopping on the Internet through the use of an avatar in a virtual shopping mall. The virtual world of the preferred embodiment is a shopping mall, although a virtual world could be created to be any perceived world; worlds mimicking our human reality and those of fantasy or science fiction are both equally achievable.

Figure 1:
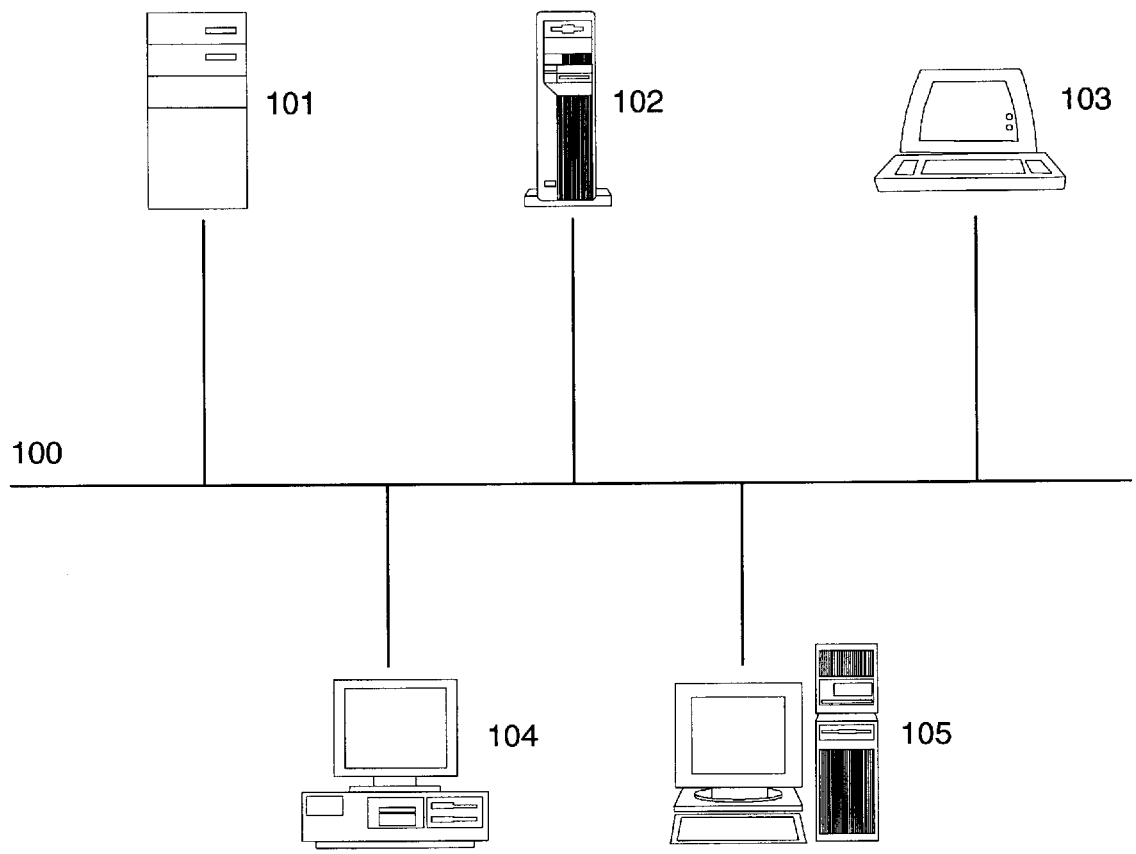

The virtual shopping mall may contain many stores, the characteristics of which, in the present implementation, physically reside on multiple servers within the Internet. An example of this is shown in FIG. 1. In our example, the computer labeled 101 is the client computer used by a user (USER1) for accessing the WWW as depicted by 100. USER1 has created an avatar (AVATAR1) for use in traversing a virtual world. A subset of the world-wide web is depicted by enumerated servers 102–105. In the present example server 102 contains the characteristics representative of a hardware store, server 103 contains the characteristics representative of a drug store, a card shop and a florist; a department store representation is split between servers 104 and 105. As is shown by this example, a single store or a single virtual world can reside in or be distributed across multiple servers which may physically reside in multiple locations.

Figure 2:
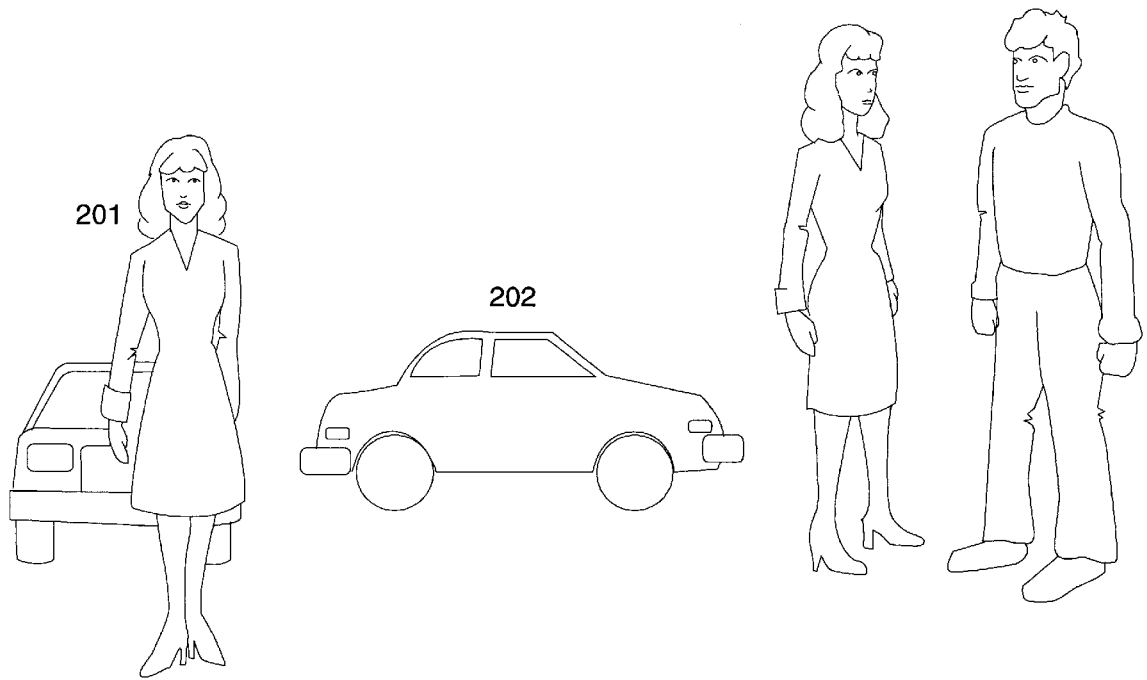
FIG. 2 depicts prior art with avatars that support first-person or third-person viewpoints.

The present invention focuses on the gestures and actions of AVATAR1 and USER1's viewpoint while those gestures are performed. FIG. 2 demonstrates two possible viewpoints that a user may have when traversing the virtual world described in FIG. 1. Viewpoint 201 represents what USER1 sees with a first-person viewpoint when encountering a virtual object or another avatar in a virtual world. Viewpoint 202 represents what USER1 sees with a third-person viewpoint when encountering a virtual object or another avatar in a virtual world. Although viewpoint 202 represents a typical third-person viewing location and direction, the configuration parameters of the present invention allow USER1 to vary the viewing location and direction on a gesture-by-gesture basis. A problem in today's virtual worlds is that switching from first- to third-person viewpoints is a manual process that limits the participants' ability to immerse themselves in the virtual world.

Figure 3:
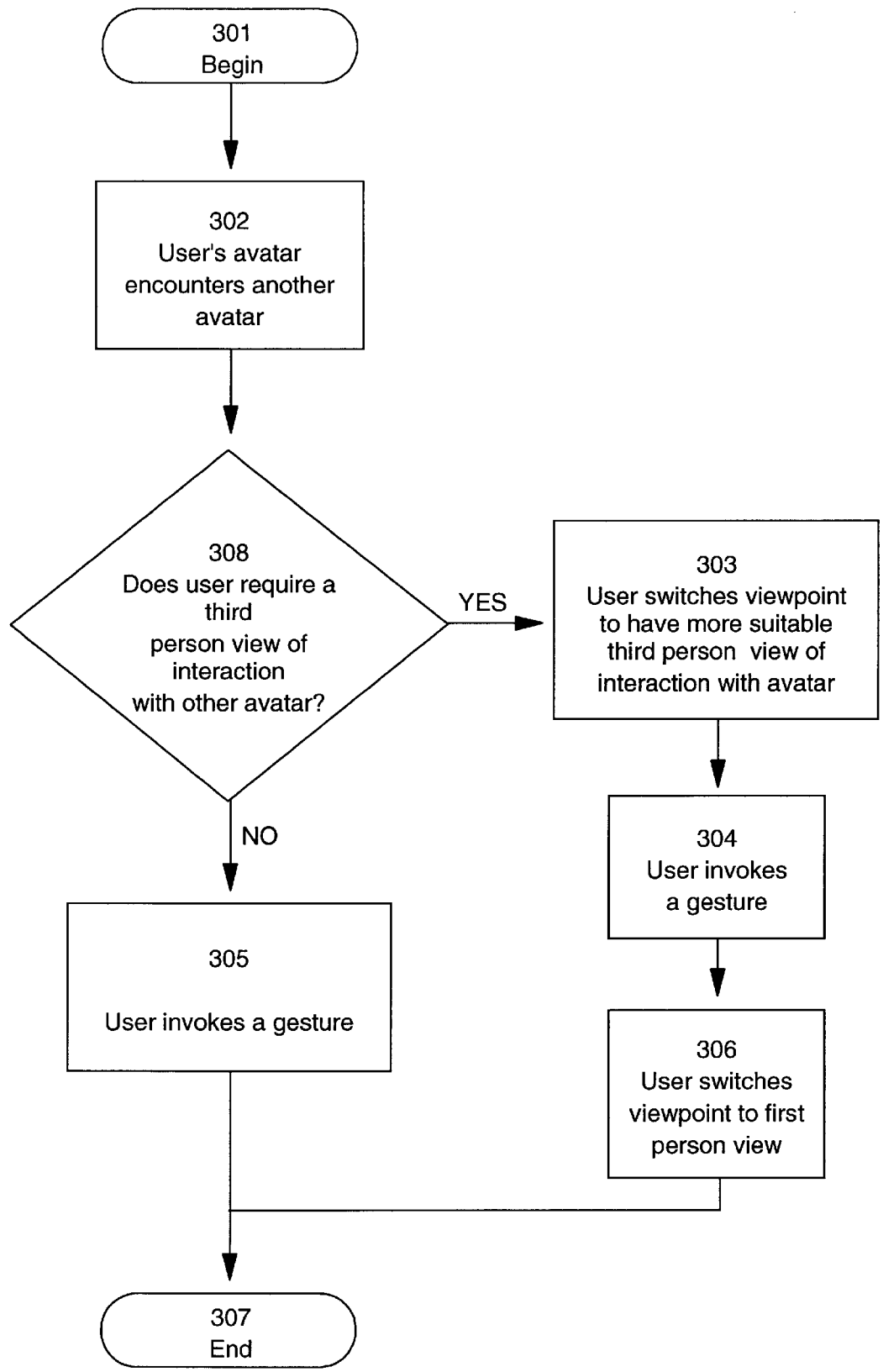
FIG. 3 depicts prior art processes for avatars that support only manual switching of avatar viewpoints from first-person to third-person.

The prior art process illustrated in FIG. 3 demonstrates the sequence USER1 experiences if AVATAR1 supports manually selected viewpoints while traversing the virtual world. At step 301 the flow begins with USER1 traversing a virtual world with AVATAR1 presenting a first-person viewpoint. When AVATAR1 encounters another avatar (302) a decision must be made as to whether this interaction should occur in another viewpoint. At decision step 308 USER1 makes this decision and proceeds to manually change viewpoints, if necessary. If a third-person viewpoint is not desired or the manual steps of shifting viewpoints are deemed too cumbersome, then USER1 proceeds to invoke a gesture such as nodding the avatar's head without invoking a no viewpoint switch (305). Although the visual impact of nodding the avatar's head could be bothersome, this is the only option available to USER1 if manual steps are to be avoided.

If a third-person viewpoint is desired, then USER1 proceeds to switch viewpoints by manually moving their mouse and clicking a control button to initiate the switch (303). Once the new viewpoint is established, USER1 proceeds to invoke the gesture (304). Once the gesture completes, USER1 manually moves their mouse and clicks a control button to initiate switching back to a first-person viewpoint (306). Whether or not the viewpoint was switched for the gesture, step 307 completes the sequence as USER1 proceeds to traverse the virtual world with a first-person viewpoint. As shown by the prior art flow in FIG. 3, present avatar technologies require a few manual steps of a user even for a simple case of viewpoint switching to witness a gesture.

Figure 4:
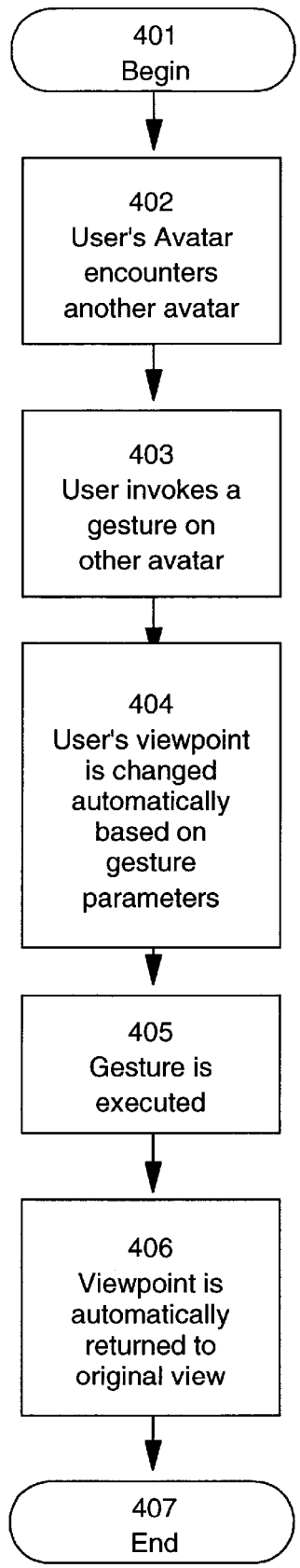
FIG. 4 shows the automatic processing of snap-views in a preferred embodiment of an avatar according to the present invention.

The present invention addresses this and allows USER1 to configure snap-view characteristics for any set of AVATAR1's gestures. Although there is a manual setup stage in the beginning if defaults are not adequate (see FIG. 5), traversal of virtual worlds with the present invention is much more natural. While traversing, snap-views are accomplished programmatically and USER1 concentrates on virtual world interactions rather than real-world avatar viewpoint settings. The flow presented in FIG. 4 demonstrates the sequence USER1 experiences if AVATAR1 supports user configurable snap-views on a gesture-by-gesture basis as defined by the present invention.

At step 401 the flow begins with USER1 traversing a virtual world with AVATAR1 presenting a first-person viewpoint. When encountering another avatar (402) USER1 does not need to make a decision regarding viewpoints before making a gesture. USER1 invokes a gesture (403) and allows the avatar snap-view settings to control viewpoint behavior. Software of AVATAR1 changes the viewpoint as configured before the gesture is executed (404). Once the viewpoint has switched, if necessary, AVATAR1 software executes the requested gesture (405). Once the gesture completes, the viewpoint is automatically returned to the one existing before the gesture request (406). Step 407 completes the sequence as USER1 proceeds to traverse the virtual world with the original viewpoint.

Figure 5:
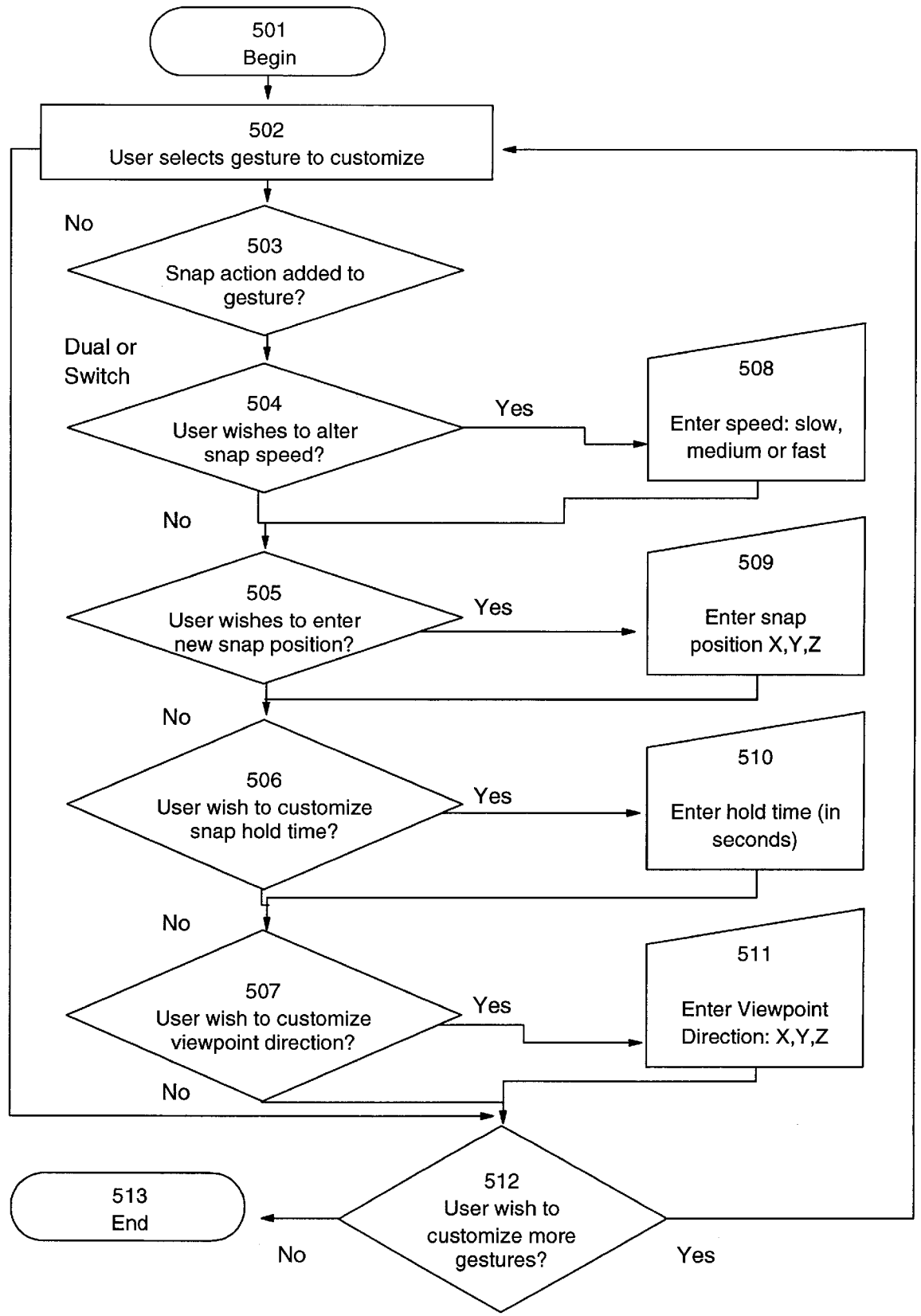
FIG. 5 depicts the process steps in a preferred embodiment of the invention for setting and recording user-configured snap-view characteristics.

As mentioned above, snap-view settings must be configured at least once, initially, if the defaults are not adequate. To allow maximum personalization, snap-view settings are configured on a gesture-by-gesture basis as shown in FIG. 5 beginning with step 501. The preferred embodiment of the present invention records snap-view settings in a linear gesture-by-gesture basis, but those technically skilled in the art will recognize that configuration can occur in a non-linear fashion with varying input orders. With the preferred embodiment, USER1 selects a gesture, such as handshake, for configuring its snap-view settings (502). First USER1 configures what snap-view action should take place with this gesture, if any (503). If USER1 wants no snap-view action then no further configuration is needed for this gesture. Otherwise, USER1 selects whether to display the snap-view as a view switch or as a dual view. Those technically skilled in the art will recognize that other values are possible for such a setting, but the preferred embodiment merely identifies view switch and dual view as useful viewpoint displays. The approach presented for the preferred embodiment is not intended to limit the scope of the present invention relating to viewpoint display mechanisms.

If USER1 chooses "view switch" then they must decide whether to set the speed at which the view switch is animated to and from the snap-view (504). If they want to set the speed setting then they proceed to choose slow, medium or fast (508). Those technically skilled in the art will recognize that speed can be configured with numerical values, different from the choices in the preferred embodiment of the present invention. The approach presented for the preferred embodiment is not intended to limit the scope of the present invention relating to animation speed. Once USER1 configures speed or has decided on a snap-view action of dual view they must decide whether to set the position from which the view originates (505). The specified position, i.e. location, from which the view originates can be specified in absolute coordinates in the world view or to a position dynamically generated relative to the avatar's position at the time of the execution of the gesture (509). In the present embodiment, if they want to set the position then they proceed to enter the X, Y and Z coordinates relative to the avatar location. Once USER1 configures the view position they must decide whether to set the return delay or elapsed time to wait before returning to the original viewpoint (506). If they want to set the return time, then they proceed to enter the desired value, in seconds, (510). Those technically skilled in the art will recognize that return time can be configured with descriptive values such as slow, medium and fast. The approach presented for the preferred embodiment is not intended to limit the scope of the present invention relating to return time. Once USER1 configures the return time, they must decide whether to set the direction in which the new view should point (507). If they want to set the viewpoint direction, then they proceed to enter the X, Y and Z coordinates relative to the avatar location (511). Note that a default of 0, 0, 0 will automatically point the viewpoint at the avatar when it executes a gesture. Those technically skilled in the art will recognize that viewpoint direction can be configured with non-relative coordinates or viewpoint angle values. The approach presented for the preferred embodiment is not intended to limit the scope of the present invention relating to viewpoint direction. Once USER1 completes configuring a gesture they must decide whether to configure additional gestures (512). If they want to configure additional gestures they select another gesture (502) and repeat the steps above. If they are done configuring gestures they exit the configuration process and can proceed to traverse the world with gesture viewpoints as configured (513). Those technically skilled in the art will recognize that viewpoint location and direction can be configured using a variety of user selection interfaces such as clicking on a graphical map. The approach presented for the preferred embodiment is not intended to limit the scope of the present invention relating to configuration value entry.

Figure 6:
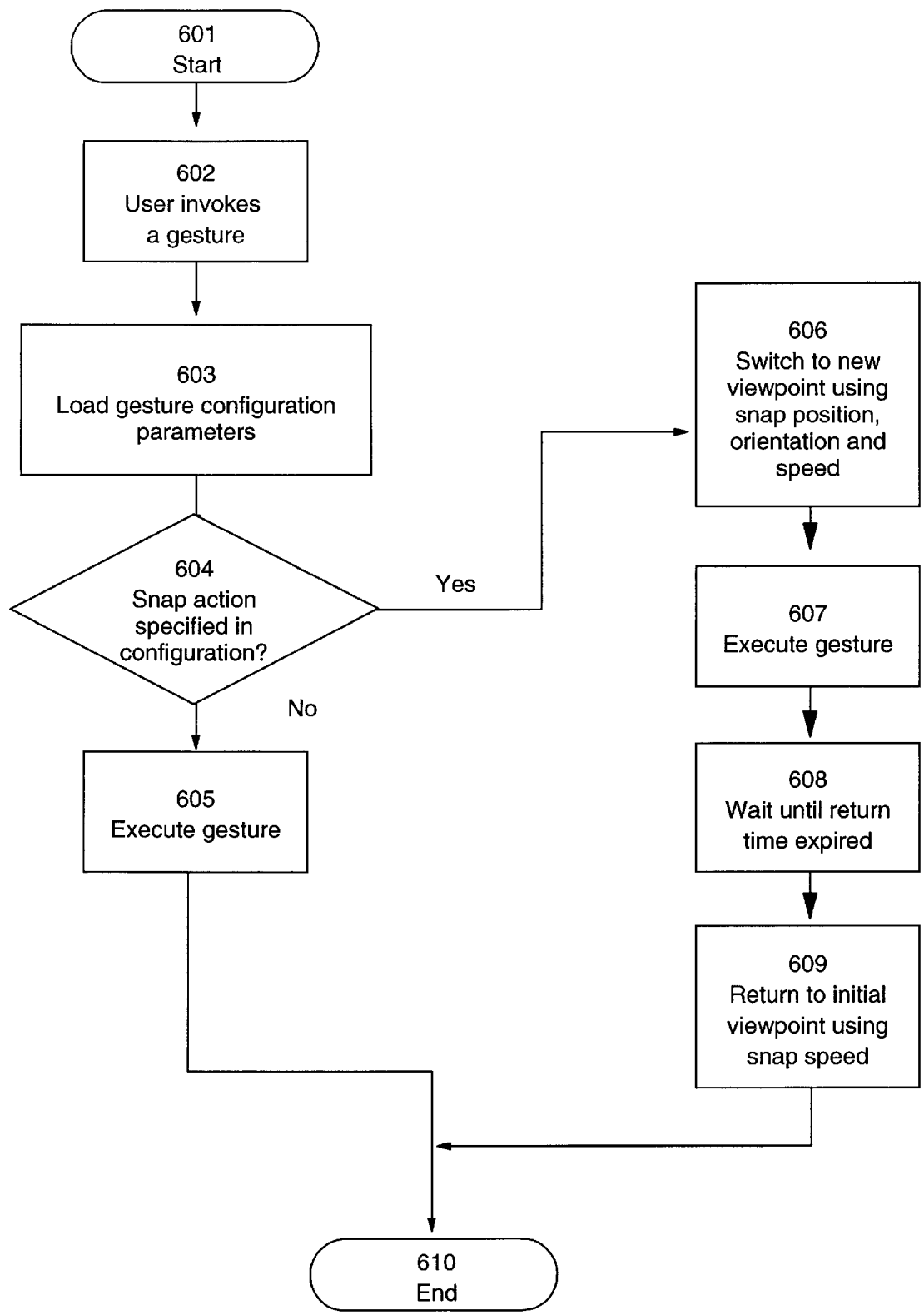
FIG. 6 depicts the detailed avatar snap-view process steps in a preferred embodiment of the invention to synchronize gesture and viewpoint processing.

The flow chart of FIG. 6 provides a detailed representation of run-time snap-view processing and synchronization with gesture execution. The flow begins with step 601 and USER1 traversing a virtual world using AVATAR1. At some point USER1 decides to invoke a gesture (602). AVATAR1 software implementing the present invention then loads the configuration values for the selected gesture (603). Those technically skilled in the art will recognize that values can be continuously resident and the load step of the preferred embodiment may not be necessary. AVATAR1 then checks the snap-view action of the gesture to determine an action to perform (604). If no action is configured then the gesture is performed with no snap-view (605) and USER1 proceeds to traverse the virtual world (610). However, if a snap-view action of view switch or dual view is configured, then AVATAR1 proceeds to animate to the new viewpoint location and viewpoint direction at the configured speed (606). If a snap-view action of dual view is configured, this step is performed in a secondary view window. Note that a snap-view action of dual view need not be animated and those technically skilled in the art will recognize that a default speed of zero for that action accomplishes this result.

Once the new viewpoint has been established, AVATAR1 proceeds to execute the requested gesture and USER1 automatically views the gesture from their configured viewpoint (607). Once the gesture completes, AVATAR1 waits the amount of time configured for the snap-view return time (608). Once the return time has passed, AVATAR1 proceeds to animate to the old viewpoint location and viewpoint direction at the configured speed (609). Once the old viewpoint is re-established, AVATAR1 proceeds to traverse the virtual world as requested by USER1 (610).

What we claim is:

1. A method for automatically changing the displayed perspective for an avatar in a virtual world traversed by a user's avatar when a gesture is executed by the avatar, said method comprising the steps of:

traversing said virtual world with an avatar;

displaying a view perspective for said avatar in said virtual world;

requesting said avatar to execute said gesture;

programmatically displaying a new view perspective for said avatar, said new view perspective being programmably associated with said gesture;

executing said gesture after said new perspective has been established; and programmatically switching from said new perspective back to the previously displayed perspective used in traversing said virtual world.

2. A method as claimed in claim 1 wherein said new view perspective is configured by said user.

3. A method as claimed in claim 1 wherein said new view perspective is configured for each said gesture.

4. A method as claimed in claim 3 further comprises selecting a view perspective action to be executed when said gesture is requested.

5. A method as claimed in claim 3 further comprising selecting a view perspective animation speed at which perspective display switching is performed to and from said new view perspective.

6. A method as claimed in claim 3 further comprising selecting a view perspective position for said new perspective display.

7. A method as claimed in claim 3 further comprising selecting a return time delay to be executed after said gesture completes and before reverting to said previous view perspective.

8. A method as claimed in claim 4 wherein said view perspective action is chosen from the set comprising no action, a complete view perspective switch to a new view perspective, or a display of said new view perspective in a new display window.

9. A method as claimed in claim 6 wherein said view perspective position is configured, by including the steps of:

selecting a location in said virtual world from which said view perspective originates; and selecting a direction in which said view perspective is directed.

10. A method as claimed in claim 9 wherein said location and said direction are each configured as a set of three dimensional coordinates relative to said avatar's location.

11. A method as claimed in claim 9 wherein said direction configuration is programmatically determined to direct the new view perspective at said avatar.

12. A computer system wherein a user's view perspective in a displayed virtual world is automatically changed upon a user's avatar execution of a gesture in sad world, said computer system comprising:

means for traversing said virtual world with an avatar;

means for requesting said avatar to execute said gesture;

means for programmatically displaying a new view perspective associated with said gesture;

means for executing said gesture after said new view perspective has been established; and means for programmatically switching from said new view perspective back to the previously displayed view perspective used in traversing said virtual world.

13. A computer system as claimed in claim 12 wherein said new view perspective is configured by said user.

14. A computer system as claimed in claim 12 wherein a new said view perspective is configured each said gesture.

15. A computer system as claimed in claim 14 wherein said configuration comprises selecting a view perspective action to be executed when said gesture is requested.

16. A computer system as claimed in claim 14 wherein said configuration comprises selecting a view perspective animation speed for switching to and from said new view perspective.

17. A computer system as claimed in claim 14 wherein said configuration comprises selecting a view perspective position for said new view perspective.

18. A computer system as claimed in claim 14 wherein said configuration comprises selecting a delay to be executed after said gesture completes and before animating back to the previously displayed view perspective.

19. A computer system as claimed in claim 15 wherein said view perspective action is chosen from the set comprising no action, a complete view perspective switch to said new view perspective or a display of said new view perspective in a new display window.

20. A computer system as claimed in claim 17 further comprising:

means for selecting a location in said virtual world from which said view perspective originates; and means for selecting a direction in which said view perspective is directed.

21. A computer system as claimed in claim 20 wherein said location and said direction are each configured as a set of three dimensional coordinates relative to said avatar's location.

22. A computer system as claimed in claim 20 wherein said direction configuration is programmatically determined to direct the new view perspective at said avatar.

23. A computer program product on a computer-readable media wherein a user's view perspective in a virtual world is automatically changed upon executing a gesture, said computer program product comprising:

computer-readable program code means for traversing said virtual world with an avatar;

computer-readable program code means for requesting said avatar to execute said gesture;

computer-readable program code means for programmatically displaying a new view perspective associated with said gesture;

computer-readable program code means for executing said gesture after said new view perspective has been established; and computer-readable program code means for programmatically switching from said new view perspective back to the view perspective used in traversing said virtual world.

24. A computer program product as claimed in claim 23 wherein said new view perspective is configured by said user.

25. A computer program product as claimed in claim 23 wherein a new said view perspective is configured for each gesture.

26. A computer program product as claimed in claim 25 wherein said configuration comprises selecting a view perspective action to be executed when said gesture is requested.

27. A computer program product as claimed in claim 25 wherein said configuration comprises selecting a view perspective animation speed at which view perspective switching is performed to and from said new view perspective.

28. A computer program product as claimed in claim 25 wherein said configuration comprises selecting a view perspective position for said new view perspective.

29. A computer program product as claimed in claim 25 wherein said configuration comprises selecting a time delay to be executed after said gesture completes and before animating back to the previously displayed view perspective.

30. A computer program product as claimed in claim 26 wherein said view perspective action is configured from the set comprising no action, a complete view perspective switch to a new view perspective or a display of said new view perspective in a new display window.

31. A computer program product as claimed in claim 28 further comprising:

computer-readable program code means for selecting a location in said virtual world from which said view perspective originates; and computer-readable program code means for selecting a direction in which said view perspective is directed.

32. A computer program product as claimed in claim 31 wherein said location and said direction are each configured as a set of three dimensional coordinates relative to said avatar's location.

33. A computer program product as claimed in claim 31 wherein said direction configuration is programmatically determined to direct the new view perspective at said avatar.

* * * * *